Patented Mar. 15, 1927.

1,621,399

UNITED STATES PATENT OFFICE.

JUDSON A. DE CEW, OF MOUNT VERNON, NEW YORK, ASSIGNOR TO PROCESS ENGINEERS, INC., OF NEW YORK, N. Y., A CORPORATION OF NEW YORK.

PAPER SIZING.

No Drawing.   Application filed April 11, 1923. Serial No. 631,371.

In the sizing of paper, it is customary to use emulsions made from rosin soap and these emulsions are coagulated while in contact with the fibres by means of an acid salt such as sulphate of alumina. This reaction produces a precipitate containing resinate of alumina, resin hydrates, alumina hydrate and coagulated resin particles.

It is a well known fact that under some mill conditions, a considerable excess of sulphate of alumina is required to produce the proper reactions but it is not known that under other conditions an excess of sulphate of alumina is extremely detrimental to the character of the precipitate, owing to the fact that the acid salt coagulates the material too suddenly and prevents the proper distribution of the sizing material over the fibres.

Therefore, the purpose of this invention is to devise a means of slow coagulation so that a more hydrated precipitate can be formed and one which, owing to the slow rate of reaction, will precipitate directly on the fibres.

To that end, I have discovered that it is impossible to retard the rate of reaction sufficiently, especially when the material is hot when an acid salt like sulphate of alumina is used. Also, I have discovered that coagulation can be made to take place while the stock is in a neutral or alkaline condition and without an acid salt like sulphate of alumina.

Although this method is applicable to rosin size and rosins, it is especially valuable for the coagulation of other emulsions such as rubber emulsions. Attempts have been made to use rubber emulsions in the sizing of paper and these attempts have been generally unsuccessful and negative in value owing to the fact that such emulsions are very sensitive and if coagulated by means of an acid or an acid salt such as alum or sulphate of alumina, they lose their waterproofing qualities and are of practically no value to the paper product in which they are incorporated.

I have discovered that rubber emulsions as well as rosin emulsions, can be coagulated by adding to the emulsions a material such as precipitated aluminum hydrate. When this product is freshly precipitated, it acts with its greatest efficiency. Owing to the fact that rosin or rubber particles in emulsion are negatively charged whereas the ions of colloidal alumina are positive, there is a slow coagulation of the emulsions when these various materials come in contact with each other and a water resistant precipitate is obtained which has very different properties from that which is formed when the emulsion is coagulated by an acid salt.

I find that these emulsions can be coagulated even in alkaline solution and this makes the process of particular value for the manufacture of kraft paper or any other where acidity is injurious to the strength of the product.

In carrying out this process, I first add the rosin or rubber emulsions to the beating engine in which the paper stock is either neutral or alkaline. After the emulsion is completely incorporated, but not yet coagulated, I add a suitable quantity of aluminum hydrate after which coagulation slowly takes place. After the materials are coagulated, I may add sulphate of alumina, without injury to the waterproofing qualities.

In order to make clear the basic principle of this discovery I may state that when an emulsion is coagulated by means of sulphate of alumina, coagulation is caused entirely by the sulphuric acid and not by the alumina. When the alumina can exert a definite influence as a coagulant, then the basic principle of this invention is being utilized.

Any sized paper that is made by the trade at the present time, has an acid reaction due to the presence of traces of sulphate of alumina, which is always used in excess to complete the sizing reactions.

What I claim is:—

1. A paper product having the fibres uniformly coated with a mixture of aluminum hydrate and rubber particles.

2. A method of coagulating rubber emulsions on paper making fibres while preparing the stock for the paper machine, which consists in mixing the rubber emulsions with the fibres in the presence of a previously precipitated aluminum hydrate formed by adding a soluble aluminum salt to a soluble alkali.

3. A method of coagulating rubber emulsions in the fibres of paper pulp, which consists in mixing the rubber emulsions with the fibres and then adding a hydrate of alumina which has been previously precipitated from an alumina salt by means of an alkali, the treatment being carried out in such a manner that there is no coagulating acidity in the mass after the alumina is added.

4. A method of depositing rubber particles in emulsion, on the surface of paper making fibres, which consists in mixing the rubber emulsions and aluminum hydrate with the paper making fibres, the paper stock being in a non-acid condition.

5. A method of depositing rubber particles in emulsion, on to the surfaces of paper making fibres, which consists in allowing a hydrated precipitate of alumina to react with the uncoagulated emulsion in the presence of the pulp fibres in an aqueous mixture.

In testimony whereof I have affixed my signature to this specification.

JUDSON A. DE CEW.